(12) United States Patent
Cameron

(10) Patent No.: US 8,411,775 B2
(45) Date of Patent: Apr. 2, 2013

(54) ITERATIVE DEMAPPER

(75) Inventor: Kelly Brian Cameron, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 103 days.

(21) Appl. No.: 13/173,829

(22) Filed: Jun. 30, 2011

(65) Prior Publication Data

US 2012/0275547 A1 Nov. 1, 2012

Related U.S. Application Data

(60) Provisional application No. 61/480,331, filed on Apr. 28, 2011.

(51) Int. Cl.
*H04L 5/12* (2006.01)
*H04L 23/02* (2006.01)
(52) U.S. Cl. .................. 375/264; 375/262; 714/794
(58) Field of Classification Search .............. 375/262, 375/264, 341; 714/794
See application file for complete search history.

(56) References Cited

U.S. PATENT DOCUMENTS

2007/0011593 A1* 1/2007 Cho et al. .................. 714/794
2011/0214029 A1* 9/2011 Steiner et al. ............. 714/746

* cited by examiner

*Primary Examiner* — Curtis Odom
(74) *Attorney, Agent, or Firm* — Garlick & Markison; Shayne X. Short

(57) ABSTRACT

Demodulation and/or demapping of a signal (e.g., based on a constellation whose points have a corresponding mapping with associated labels) is performed such that each dimension is processed separately without accounting for influences from the other dimension. For example, the demapping process operates on each respective dimension separately and independently. In some instances, the processing operates iteratively, in that, information identified from processing one of the dimensions is employed in directing the processing in another of the dimensions. Such operation may be performed iteratively by updating/modified information associated with one or more of the dimensions as well. Moreover, decoding may operate in accordance with iterative demapping (e.g., error correction code (ECC) and/or forward error correction (FEC) code by which information bits are encoded) to make estimates of bits within a signal sequence, and those estimates may be used in a subsequent iteration of demapping.

27 Claims, 10 Drawing Sheets

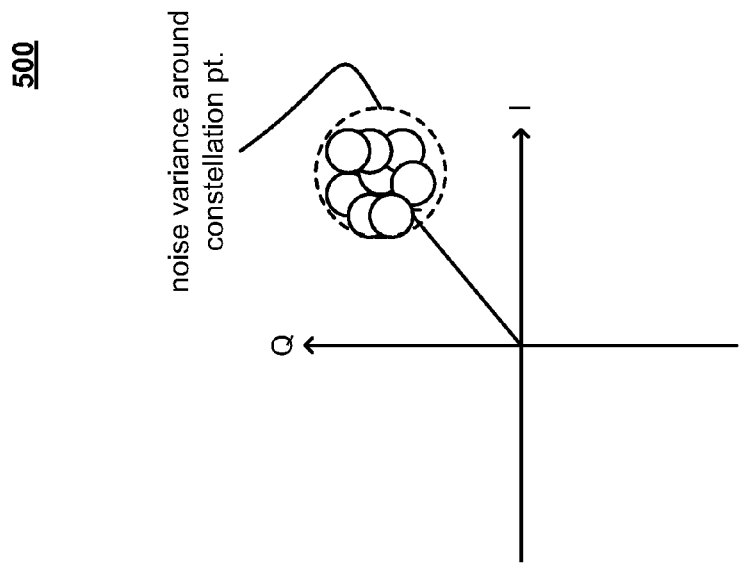
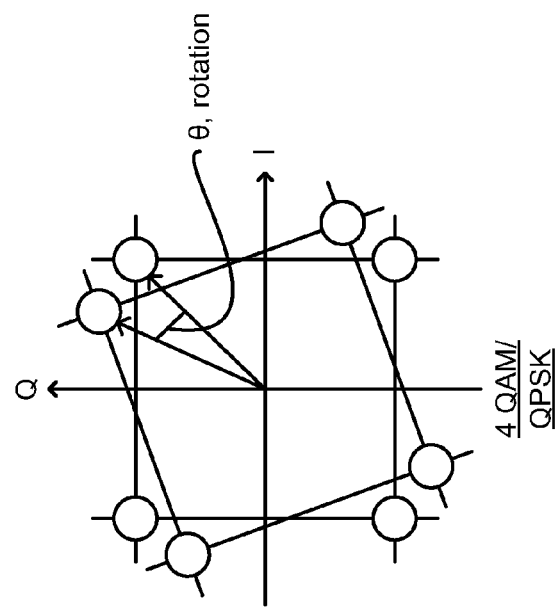
FIG. 5

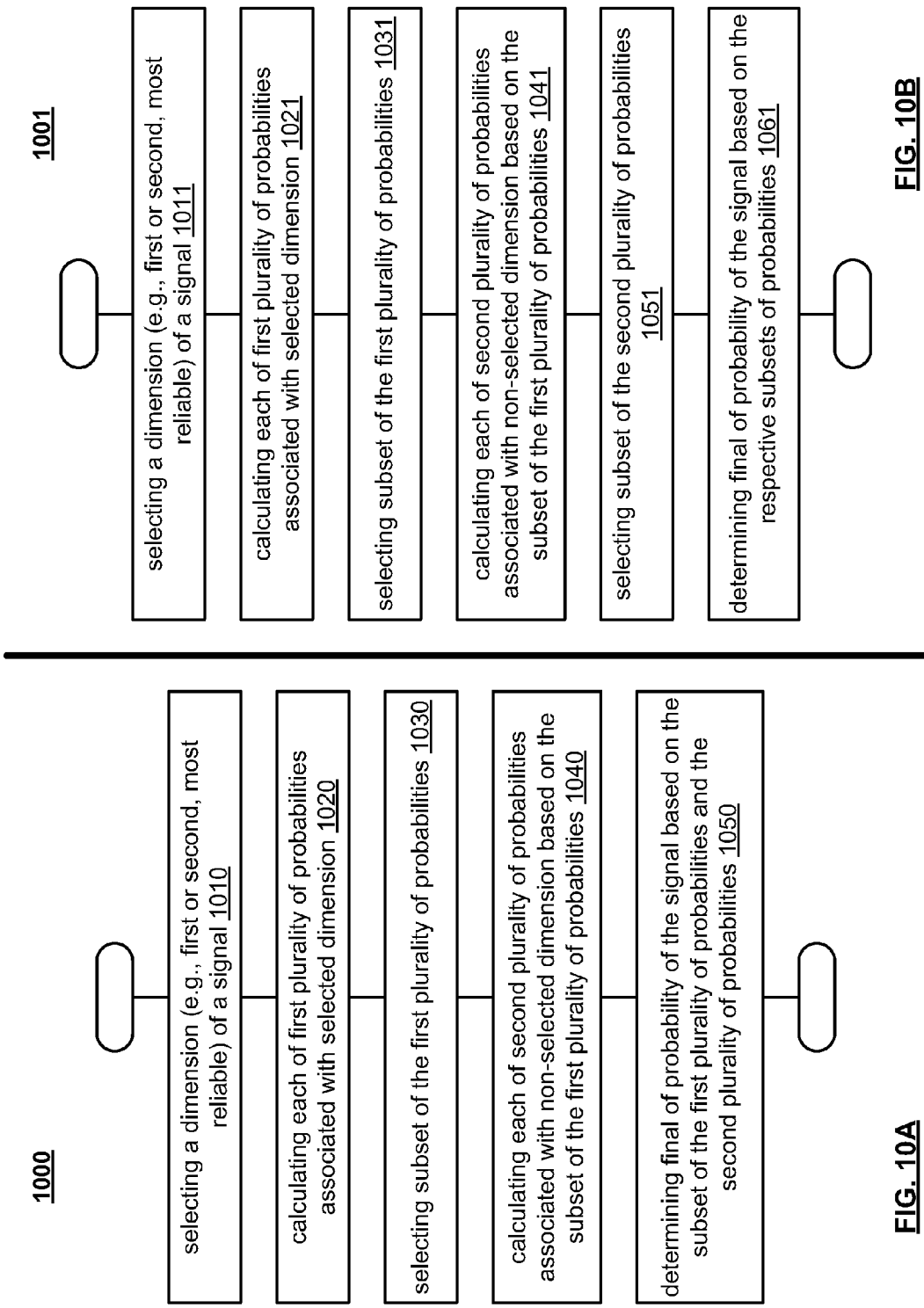

ITERATIVE DEMAPPER

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/480,331, entitled "Iterative demapper," filed Apr. 28, 2011.

BACKGROUND OF THE INVENTION

1. Technical Field of the Invention

The invention relates generally to communication systems; and, more particularly, it relates to devices and methods for performing processing, including demodulation and/or symbol mapping, of communication signals received within such communication systems.

2. Description of Related Art

Data communication systems have been under continual development for many years. Within such communication systems, oftentimes digital information is modulated (e.g., associated with a label and mapped to a corresponding constellation point within a given constellation thereby generating signaling points) in accordance with generating a continuous time signal to be transmitted across a communication channel.

At the receiver end of the communication channel (e.g., in a receiver communication device), the received signal undergoes demodulation and/or demapping in an effort to try to recover the original signaling points generated in accordance with modulation in a transmitter communication device. However, because an actual communication system and its associated communication channel(s) are typically imperfect, a signal may be corrupted during transmission from a transmitter communication device to a receiver communication device (e.g., from distortion, noise, interference, etc.). Because of this, the signaling points are oftentimes not recovered perfectly in a receiver communication device.

While there has been much effort in the art over the past many years to try to address such issues, there still exists in the art significant deficiencies and a seemingly never-ending desire to support communications more effectively and with better performance.

Generally speaking, within the context of communication systems, there is a first communication device at one end of a communication channel (e.g., with encoder and modulation capability) and second communication device at the other end of the communication channel (e.g., with de-modulation and decoder capability). In many instances, one or both of these two communication devices includes both modulation/encoder and de-modulation/decoder capability (e.g., within a bi-directional communication system).

While there has been much effort in the art over the past many years to try to address such issues, there still exists in the art significant deficiencies and a seemingly never-ending desire to support communications more effectively and with better performance.

BRIEF DESCRIPTION OF THE SEVERAL VIEWS OF THE DRAWINGS

FIG. 5 illustrates an embodiment of noise variance around a given constellation point and associated rotation that may be made base thereon.

FIG. 8A, FIG. 8B, FIG. 9, FIG. 10A, and FIG. 10B illustrate various embodiment of methods for operating a communication device.

DETAILED DESCRIPTION OF THE INVENTION

Figure 1:
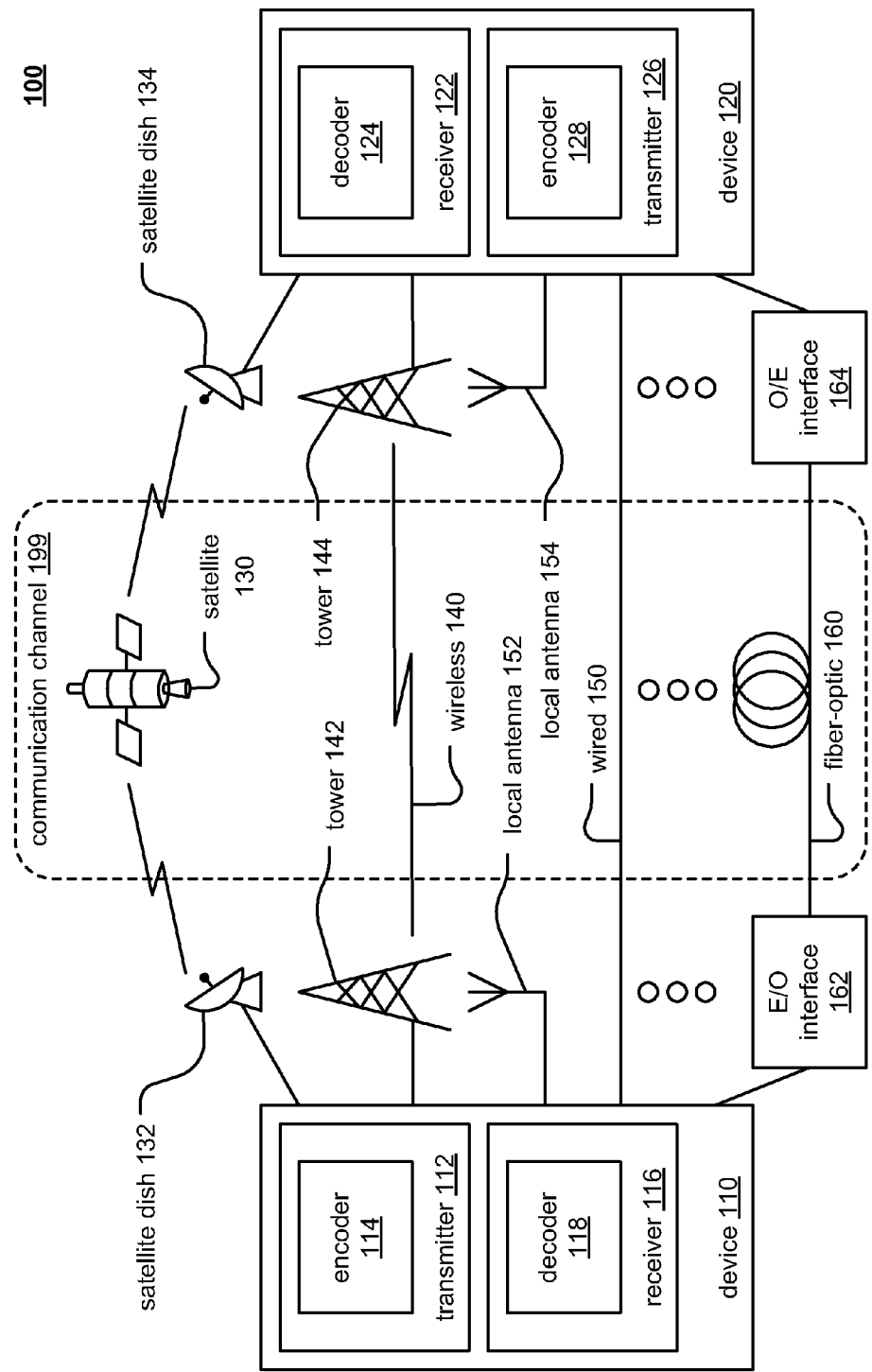
FIG. 1 and FIG. 2 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
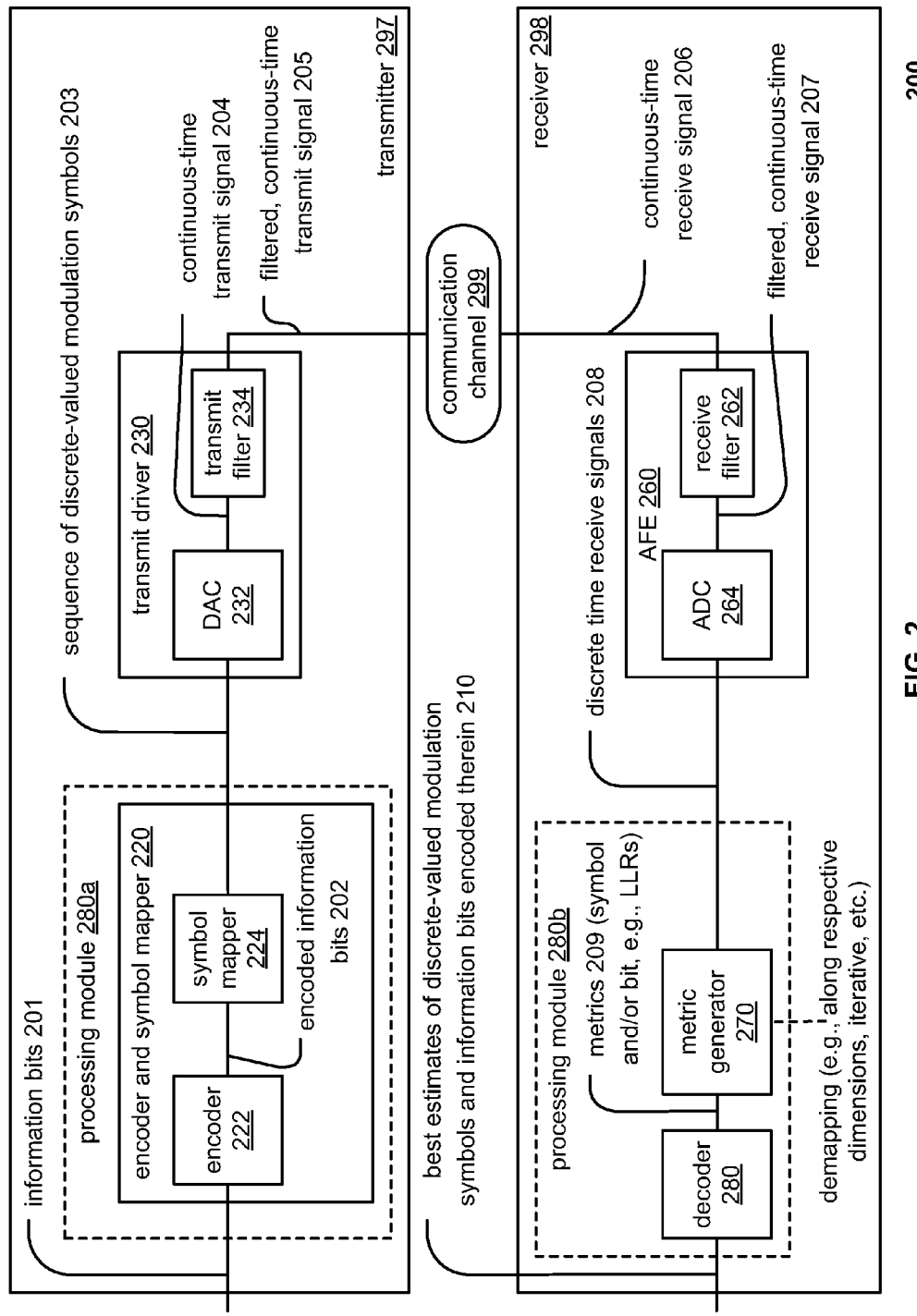

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Prior to transmission or launching of a signal into a communication channel, digital communications systems typically encode information with an error correction code. In accordance with the operations of such an encoder 222 and decoder 280, any desired error correction code (ECC) and/or forward error correction (FEC) code may be employed including turbo, turbo trellis coded modulation (TTCM), LDPC (Low Density Parity Check), Reed-Solomon (RS), BCH (Bose and Ray-Chaudhuri), convolutional, etc. and/or any combination thereof. The resultant data incorporates the original information (e.g., the original information bits) along with some redundancy (e.g., coded bits generated based on the original information bits). This resulting information (e.g., which may be of a systematic or nonsystematic nature) then undergoes modulation in accordance with generating a sequence of signaling constellations points (e.g., sometimes referred to as symbols) thereby generating a continuous time signal that is then launched into a communication channel transmission or provided via a storage channel.

However, due to imperfections of the channels used to transmit or store information, the signaling points may be recovered imperfectly (e.g., such as in a receiver communication device). The sources of such deleterious effects that may corrupt a signal during transmission may be many including distortion, noise, interference (e.g., inter-symbol interference (ISI), inter-code interference (ICI), etc.), multi-path effects, etc. Assuming the corruption is not too great, the original information content can be recovered by utilizing the redundancy added to the data prior to transmission.

One of the first steps in recovering the original information (data) is to assess the corrupted signaling constellation points. Generally speaking, this process is called demapping (also sometimes referred to as symbol demapping, demodulation, etc.).

Specifically, if each respective constellation point of a modulation corresponds to and encodes K bits worth of information (e.g., each constellation point has a respective K bit label), then each constellation point should initially have been one of $2^K$ discrete values or constellation points within the given modulation. Identifying which of those $2^K$ values was actually sent is sufficient to recover the original information. When the signaling constellation points are corrupted by noise, this cannot typically be done with absolute certainty.

The demapper is operative to take the corrupted signaling constellation points, along with estimates of the amount of distortion, noise, interference, etc. present and 'a priori' probabilities of the constellation points. Then, the demapper is operative to produce estimates of the values and reliability information corresponding to each of the respective constituent bits. Once this information is determined, it may be used by a decoder (e.g., an ECC and/or FEC decoder) decoder to recover the original information (e.g., the original bits). In certain embodiments, the demapping operations and functionality is presented herein are particularly applicable to systems performing iterative demapping between the demapper and a decoder (e.g., an error corrector such as an ECC and/or FEC decoder).

In one embodiment, all of the 'a priori' information is initially set to equal values (e.g., each having a common respective probability). This may be viewed as corresponding to a situation in which no 'a priori' information is available. At this point, the demapping operations are performed (e.g., such as within an iterative demapper). Upon completion of demapping operations (e.g., after performing one or more iterations), the resultant probability information generated thereby is provided to the error corrector (e.g., decoder), which produces bit probabilities of all processed information. Then, if desired, these bit probabilities may be fed back, in accordance with iterative demapping, for use as 'a priori' information and the demapping operations may be performed once again. However, during these demapping operations, the results provided from the error corrector (e.g., decoder) improve the demapping process. These updated demapper probabilities are then fed back to the error corrector (e.g., decoder). This iterative process may continue until one or more stopping criteria is/are met. For example, one stopping criterion may be the completion of a fixed/predetermined number of iterations. Any other stopping criterion may alternatively be employed or used.

In addition, while various embodiments presented herein are described in accordance with iterative processing, performing multiple iterations, etc., it is noted that at least two different types of iterations may be performed in accordance with in accordance with various aspects, and their equivalents, of the invention. For example, certain embodiments operate in accordance with iterative demapping which allows the information from each respective dimension to be used to improve the probability estimates of the other dimension and (e.g., information calculated for the selected dimension is used for improving information calculation for the non-selected dimension) [which may be viewed, from certain perspectives, as local iterations].

In other certain embodiments that operate in accordance with iterative demapping, by providing for the optional incorporation of 'a priori' information in each of the respective one-dimensional computations, iterations may be performed cooperatively between a demapper and an error corrector (e.g., decoder) [which may be viewed, from certain perspectives, as global iterations].

In other words, the iterative processing as described herein may be viewed as being performed locally, by providing for improvement between the respective dimensions, or globally, by providing for improvement between a demapper and an error corrector (e.g., decoder). Of course, certain embodiments envisioned herein may perform both levels of iterative processing.

As may be understood, the demapping process and operations may unfortunately be done imperfectly for a variety of reasons. In addition, as the sizes of constellations continue to grow (e.g., increasing in numbers of constellation points, extending further from the origin of the various axes [in-phase and quadrature axes or real and imaginary axes]), the problem of performing demapping accurately may become even more challenging and difficult. For example, in such cases, each respective signaling point can incorporate a large amount of information and the number of computations required to perform demapping of the constellation "perfectly" can grow significantly (e.g., exponentially).

In these cases, certain simplifying assumptions may be made to reduce the computational complexity to a tractable level. Unfortunately, in some systems, significant information loss may also occur when such simplified demapping procedures are used (e.g., the simplifying assumptions can come with a cost of increased error rates). This can of course result in sub-optimal system performance. Simulations indicate these losses to be on the order of 0.3 dB for traditional systems dominated by Gaussian white noise.

In systems specifically designed to mitigate the effects of Rayleigh or Rician channel fading, the losses can easily be on the order of 1.0 dB or more. These effects often dominate wireless performance in cell phone systems, as well as terrestrial data or video transmission systems, among other communication systems types.

Communication channels with many strong reflectors therein (e.g., which may result in many multi-path effects), as also occurs in terrestrial digital broadcast systems, may unfortunately experience many deep signal nulls. In such instances, the loss can reportedly be on the order of 5 dB or more.

With respect to these losses, one approach in the art merely accepts them because certain demapping algorithms known to more completely extract the signaling information rapidly grow in complexity to levels that are not readily implemented in consumer level products (e.g., too complex, too costly, consume too much processing resources, require too much real estate/area within a device or integrated circuit, etc.).

A novel approach for performing demapping is presented herein that can be implemented reasonably in consumer products while retaining the performance levels expected from a mathematically exact demapper.

Generally speaking, the demapping functionality and/or architecture in accordance with various aspects and principles, and their equivalents, of the invention may be applied to signaling constellations of any desired size (e.g., from relatively low modulations such as quadrature phase shift keying (QPSK, or 4 quadrature amplitude modulation [4 QAM]), 8 phase shift keying (8-PSK), 16 QAM, 16 amplitude phase shift keying (APSK)), but may be even more operative to provide efficiencies for even large signaling constellations (e.g., 64 quadrature amplitude modulation (QAM), 256 QAM, 1024 QAM, etc.).

It is noted that while the demapping functionality and/or architecture in accordance with various aspects and principles, and their equivalents, of the invention may in fact be applied to signaling constellations of any desired size, greater benefit and higher performance may sometimes be seen with respect to multi-dimensional signaling constellations. For example, while such demapping operations and functionality may in fact be applied to very low order modulation types and signaling constellations (e.g., pulse-amplitude modulation (PAM)), more significant improvement in performance may be seen for higher order modulation types including multidimensional signaling constellations.

In some instances, the probability computation employed in accordance with such demapping operations and functionality may not be able be simply factored, or split apart, into independent dimensions. For example, considering a QAM type constellation that has been rotated and may have different noise variances in each respective dimension, the probability computation may not be able to be separated into independent dimensions. Such effects may be realized in a QAM constellation whose respective constellation points have been labeled in such a way as to make the bits of the constellation labels dependent on more than one dimension. For example, this will occur for two dimensional signaling constellations corresponding to the encoding of an odd number of bits.

Figure 3:
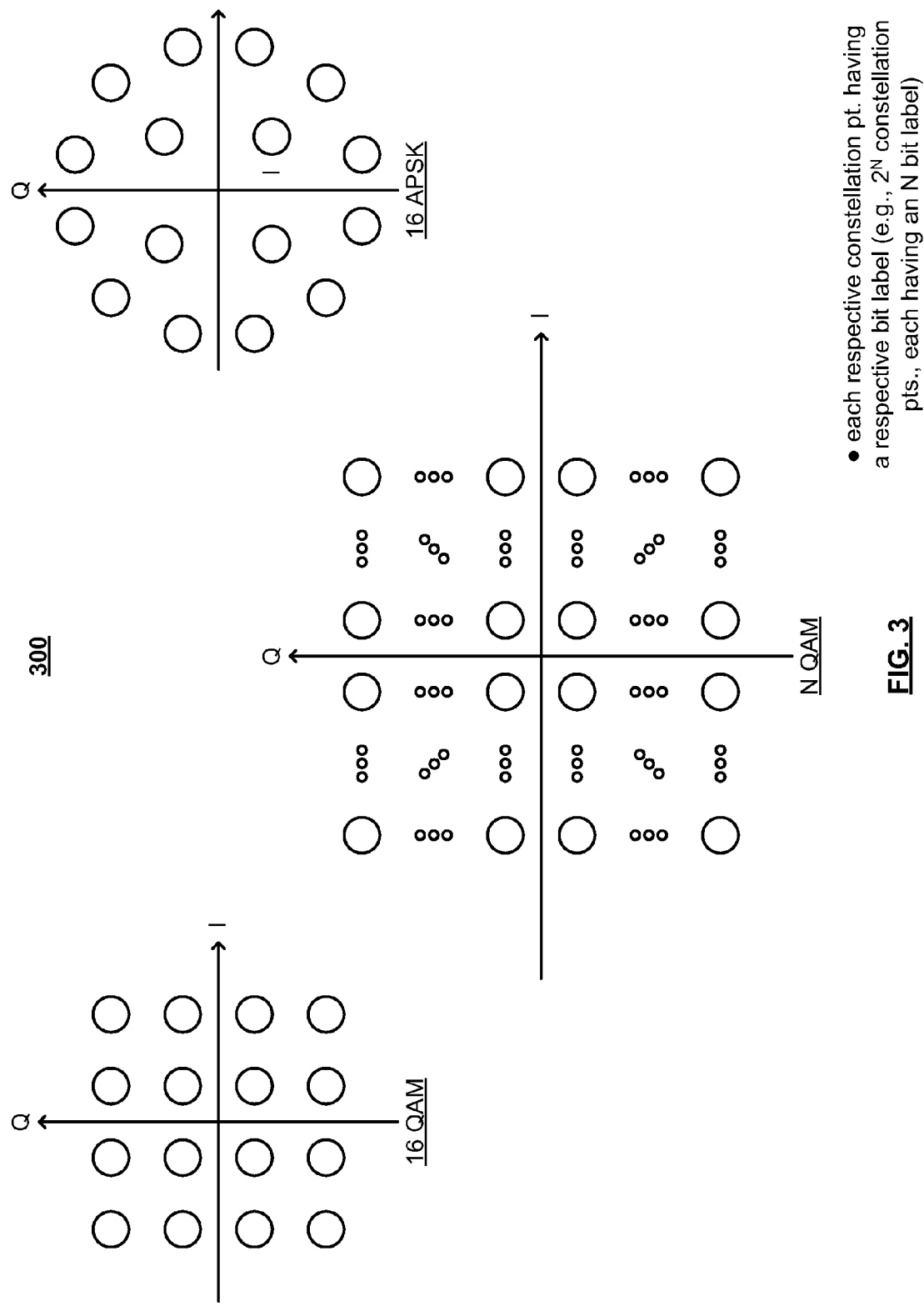
FIG. 3 illustrates an embodiment of various types of modulations.

FIG. 3 illustrates an embodiment 300 of various types of modulations. This diagram shows some examples of various types of modulations. For example, a 16 QAM modulation includes 16 constellation points therein, and each respective constellation point having a respective label to which symbols or combinations of bits of that label are mapped or associated. Also shown is a 16 APSK modulation. Generally, any size or shape of constellation may benefit from the various aspects and principles, and their equivalents, of the invention including a generic size N QAM modulation.

While it is of course noted that such demapping functionality and/or architecture may be applied to small signaling constellations, the reduction in computational complexity may not be quite compelling in those cases.

In certain embodiments, the demapping functionality and/or architecture in accordance with various aspects and principles, and their equivalents, of the invention may also be particularly applicable to systems that are designed to mitigate the effects of fading communication channels through the use of I/Q delay, rotated constellations, and iterative demapping, as is the case with the European DVB-T2 digital video transmission standard.

The demapping process may be described mathematically. For a given constellation Z, bit to be demapped, b, and signaling point Y, the demapping process may be described as follows:

$$P_b(Y) = \left(\sum_{\forall a \in A} App_a p_a(Y)\right) \Big/ \left(\sum_{\forall z \in Z} App_z p_z(Y)\right) \quad (1)$$

where

Z is the set of all constellation points,

A is the set of all points in Z where the given bit, b is logical zero, $App_i$ is the 'a priori' probability that constellation point, i, was sent (i∈Z), $p_i(Y)$ is the probability distribution function of the noise corrupting constellation point i (i∈Z), $P_b(Y)$ is the probability of bit b having a value of logical zero given signaling point Y.

It is noted that for all places where a logical zero is specified, those respective locations may alternatively be specified as logical one. The choice of reference logic value may vary depending on designer's choice, application, etc.

Also, though (1) is expressed in terms of probabilities, implementations may be expressed in other domains, such as log probability, log likelihood ratios, etc. without departing from the scope and spirit of the invention.

Assuming a two dimensional (2-D) signaling constellation, and independent, but rotated, Gaussian noise distributions, $p_i(Y)$, (i∈Z), may be expressed as follows:

$$p(Y) = \frac{1}{(2\pi\sigma_x\sigma_y)} e^{-\left[\overbrace{\frac{(x-x_i)^2}{2}\left(\frac{\cos^2\theta}{\sigma_x^2}+\frac{\sin^2\theta}{\sigma_y^2}\right)}^{x\ related\ term} + \overbrace{\frac{(y-y_i)^2}{2}\left(\frac{\cos^2\theta}{\sigma_y^2}+\frac{\sin^2\theta}{\sigma_x^2}\right)}^{y\ related\ term} + \overbrace{\frac{(x-x_i)(y-y_i)}{2}\sin 2\theta\left(\frac{1}{\sigma_x^2}-\frac{1}{\sigma_y^2}\right)}^{cross-correlation/product\ term}\right]} \quad (2)$$

where x is the real component of Y, y is the imaginary component of Y, $x_i$ is the real component of constellation point i, $y_i$ is the imaginary component of constellation point i, $\sigma_x^2$ is the variance of the real component of the Gaussian noise.

$\sigma_y^2$ is the variance of the imaginary component of the Gaussian noise.

It should be noted that, if not for the cross product term:

$$\frac{(x-x_i)(y-y_i)}{2}\sin 2\theta\left(\frac{1}{\sigma_x^2} - \frac{1}{\sigma_y^2}\right) \quad (3)$$

(2) would be separable in x and y. This would permit (2) to be decomposed into two separate and distinct one dimensional (1-D) problems, each of which would require the computation of only the square root of Z probabilities. Herein, this decomposition may be performed in spite of the cross correlation/product term (3).

Though (2) is symmetrical in x and y, this symmetry is misleading. It is informative to consider how (3) affects (2) as $\sigma_x^2$ varies relative to $\sigma_y^2$. Both of the dimensions (e.g., x and y) contribute equally to the resultant probability value only when the noise power in the two dimensions is equal, i.e., $\sigma_x^2=\sigma_y^2$. However, in this case, the cross correlation/product term (3) is equal to 0. This term gradually increases from 0 as the disparity between noise power between the two dimensions (e.g., x and y) grows.

This relationship allows the following observations to be made:

There is no information flow between the dimensions (e.g., x and y) when the noise powers are equal. Under this condition, (2) may be factored.

From an information theoretic standpoint, the cross correlation/product (3) transfers information from the dimension with smaller noise to the dimension with larger noise. The magnitude of this effect grows as the disparity in signal integrity increases, until nearly all information about the less reliable dimension comes from the more reliable dimension.

No matter the relative magnitude of $\sigma_x^2$ and $\sigma_y^2$, the dimension with the larger noise has relatively little or limited effect on the resultant probability values for the more reliable dimension.

Taken together, these observations permit demapping to be performed in accordance with calculating the probability values one dimension at a time and then combining the results to obtain an accurate estimate of the resultant bit probabilities (e.g., the final probability of the signal or the signaling point).

Generally speaking, the demapping functionality and operations as presented herein may be viewed as determining which of the two dimensions (of a two-dimensional signaling constellation) is most reliable. In the instance when both dimensions are equally reliable, one of them may be selected. Then, the bit probabilities (or their proxies) are computed for the selected dimension. Using this computed information from the selected dimension, the bit probabilities (or their proxies) are computed for the other dimension (i.e., the dimension which was not firstly selected, the unreliable dimension). Any 'a priori' information as well as information from the other dimension is employed in the computation of the bit probabilities (or their proxies) corresponding to the other dimension.

Then, in some embodiments that perform one or more iterative operations, using the information having been calculated for this other dimension, the firstly calculated bit probabilities (or their proxies) are recalculated or updated (e.g., those bit probabilities (or their proxies) corresponding to the first selected dimension). If desired, additional iterations may be performed as well. That is to say, the recalculated or updated information corresponding to the first selected dimension may then be employed for recalculating or updating information corresponding to the other/non-selected dimension, and so on.

In an alternative embodiment, considering the situation described above in which a particular signaling constellation may have different noise variances in each respective dimension, the demanding operations and functionality as described just above may alternatively be implemented by performing the probability computations for all bits which can in fact be factored into a single dimension. In the instance in which a two dimensional signaling constellation corresponds to an odd number of bits, this may be performed for all of the bits except for one (e.g., given the odd bit count of such signaling constellations). Then, using this information (e.g., derived from the probability computations for those bits which can in fact be factored into a single dimension), probability computations may be performed for those probabilities associated with the other dimension (e.g., the non-factorable bit probabilities). Within such an alternative embodiment, as within others, one or more additional iterations may be performed by alternatively and respectively updating the bit probabilities corresponding to each of the respective dimensions.

In some instances, the probability computation employed in accordance with such demapping operations and functionality may not be able be simply factored, or split apart, into independent dimensions. For example, considering a QAM type constellation that has been rotated and may have different noise variances in each respective dimension, the probability computation may not be able to be separated into independent dimensions. Such effects may be realized in a QAM constellation whose respective constellation points have been labeled in such a way as to make the bits of the constellation labels dependent on more than one dimension. For example, this will occur for two dimensional signaling constellations corresponding to the encoding of an odd number of bits.

It is note that certain embodiments of the functionality and/or architecture herein may actually be implemented in the −log(p) and the log-likelihood domains instead of the probability domain indicated by the equations above. Such particular choice of the particular domain in which to implement such functionality and/or architecture may depend on a designer's choice, application context, etc. Any probability representation may be used to implement the functionality and/or architecture herein without departing from the scope and spirit of the invention.

Figure 4:
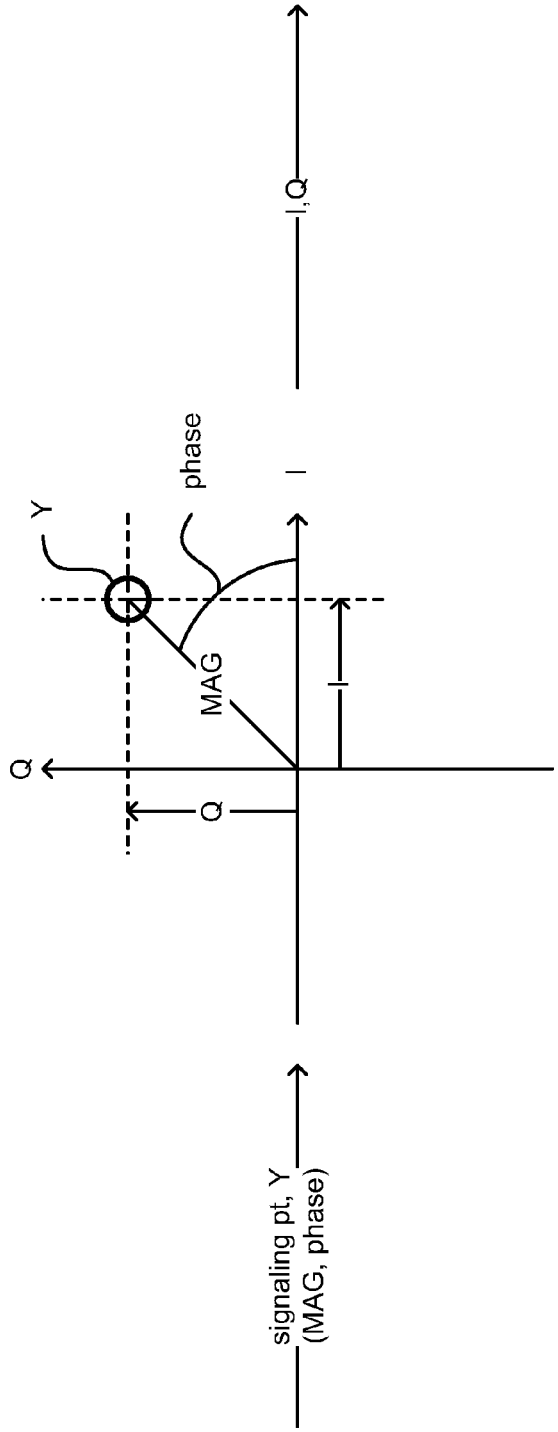
FIG. 4 illustrates an embodiment of in-phase and quadrature extraction of a received signaling point.

FIG. 4 illustrates an embodiment 400 of in-phase and quadrature extraction of a received signaling point. A received signal or signaling point, Y, having a magnitude and phase undergoes in-phase and quadrature (I, Q) extraction. This signaling point, Y, (or signal) is mapped in a two dimensional (2-D) space such that an in-phase and a quadrature component are extracted there from. This in-phase measurement and the quadrature component may be provided as output for use in subsequent processing (e.g., such as in accordance with a baseband processor, in an error correction code (ECC) and/or forward error correction (FEC) decoder, etc.).

FIG. 5 illustrates an embodiment 500 of noise variance around a given constellation point and associated rotation that may be made base thereon. As may be understood, a received signal may not perfectly align with one of the constellation points in the constellation and modulation. For example, because of some deleterious effect (e.g., distortion, noise, interference, etc.), the received signaling point, Y, may unfortunately not align perfectly to one of the constellation points. Also, in some instances even if the received signaling point, Y, does in fact perfectly align with one of the constellation points, it may have been sent as corresponding from another constellation point (e.g., the received signaling point may have been sent as corresponding to X [i.e., some constellation point not Y], yet was actually received as if it corresponded to Y). For example, this effect may be viewed as being a noise created distribution around a given constellation point (e.g., such as on right hand side of the diagram). As a number of signaling points associated with a given constellation point are received over time, then a distribution of them may be generated around that constellation point based on the actual locations of multiple received signals.

In addition, it is noted that while some noise distributions of a given constellation point will be largely circular in nature and generally centered on that respective constellation point, if the noise variance in two dimensions is quite different (e.g., noise variance in one dimension being quite different from the noise variance in the other dimension), then such probability distributions can become highly eccentric, along the axis of rotation. It is noted that while the noise distribution around the constellation point at the right hand side of the diagram is depicted as being largely circular in nature and generally centered on that respective constellation point for ease of illustration for the reader, this will not always be the case.

Also, with respect to the origin of the I, Q axes, a given constellation may sometimes undergo rotation (e.g., shown as by θ) as a function of time so that signals transmitted at different times are associated with different aligned constellation. This is shown using a 4 QAM/QPSK modulation for illustration to the reader. Of course, such operation may be extended to any type of constellation including those of different shapes and having different numbers of constellation points therein.

Figure 6:
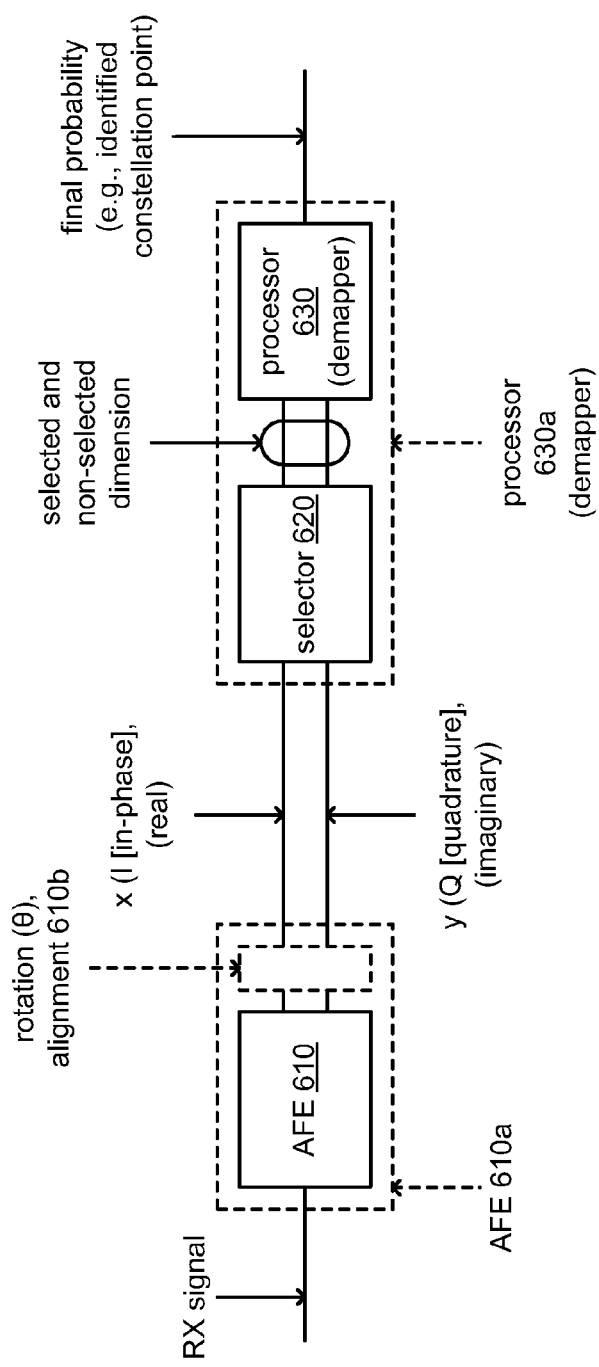
FIG. 6 and FIG. 7 illustrate various embodiments of communication devices.
Figure 7:
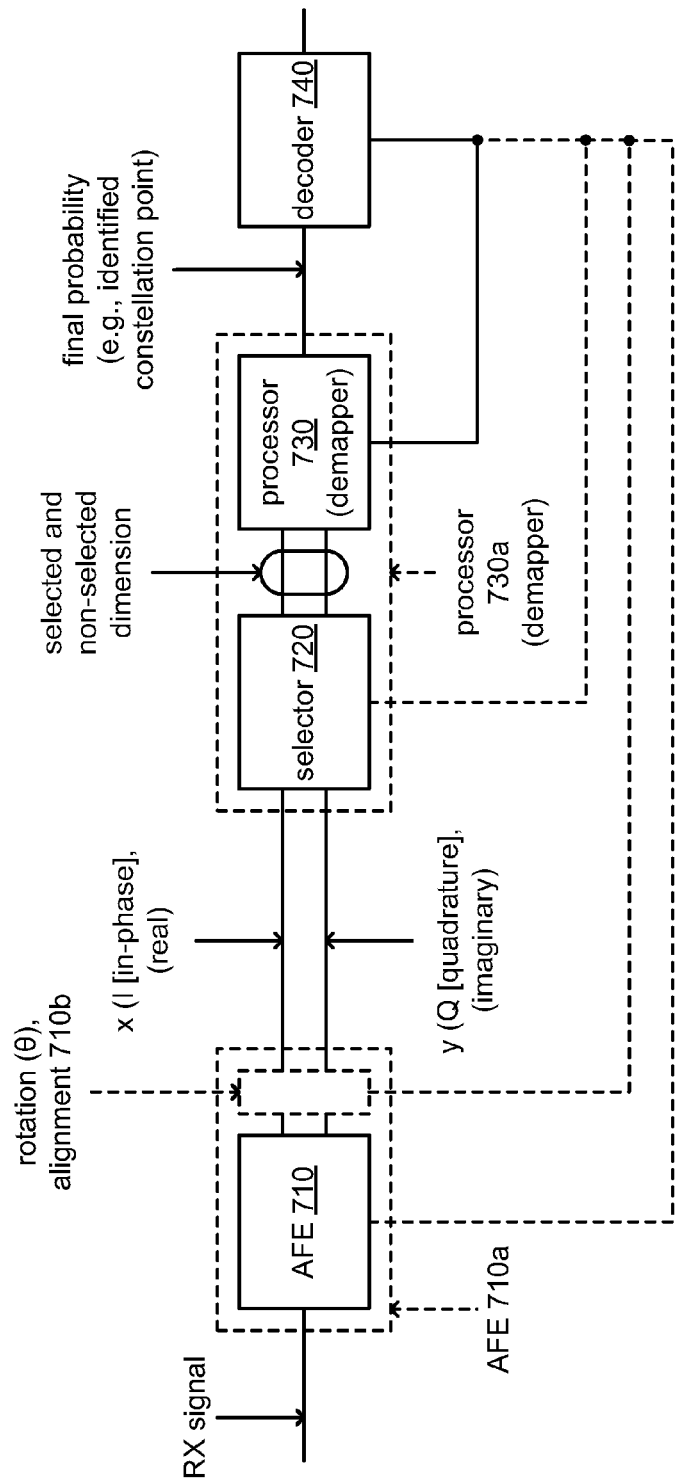

FIG. 6 and FIG. 7 illustrate various embodiments of communication devices.

Referring to the embodiment 600 of FIG. 6, one embodiment operates by receiving a signal (e.g., such as from a communication channel or from a storage medium). Such a signal undergoes any appropriate processing in an analog front end (AFE) 610 to perform any necessary or desired frequency conversion, filtering (analog or digital), digital sampling (such as in an analog to digital converter (ADC)), etc. to generate a digital signal (such as a baseband signal).

If needed in some embodiments (such as those that may perform some rotation of a constellation in accordance with transmit processing), a signaling point may undergo rotation by θ (e.g., to align it with the original, pre-rotated signaling constellation). The resultant point consists of two values, x and y. These two signal components may be viewed as corresponding to two respective dimensions such as an in-phase dimension and a quadrature dimension, respectively. Alternatively, these two signal components may be viewed as corresponding to two respective dimensions such as a real dimension and an imaginary dimension, respectively. An AFE 610a may include such functionality to perform this rotation; alternatively, a module or component 610b may be implemented to perform such rotation operations.

With respect to each of these respective dimensions, a respective and corresponding reliability is determined and associated therewith. The associated signal reliability information of these respective dimensions is used to determine which of the two dimensions is the most reliable. For example, the relative reliability of the first dimension component and the second dimension component may be based on a first noise power associated with the first dimension component and a second noise power associated with the second dimension component. If the respective dimensions have the same or equal reliability, either of the first dimension or the second dimension may be chosen. Generally speaking, one of the dimensions is selected.

A selector 620 may be implemented to perform the selection of one of these dimensions; alternatively, a processor 630a (or demapper) may include such functionality to perform the selection operations. For example, a selector 620 may be implemented separately from a processor 630 (or demapper), or processor 630a (or demapper) may be implemented that includes functionality to perform the selection operations.

In the processor 630 (or 630b), associated 'a priori' bit log-likelihood information is converted to the −log(p) domain and −log(p) values, $r_i$, for each of the one dimensional constellations points, is computed (e.g., in accordance with an embodiment operations in the −log(p) and the log-likelihood domains). Again, one embodiment operates in accordance with the −log(p) and the log-likelihood domains, though of course any other desired domain may be employed without departing from the scope and spirit of the invention.

The processor 630 (or 630b) continues by calculating values $z_i = K_x((x-x_i)^2$ for all one dimensional constellation points, xi in the most reliable dimension, where x is the most reliable component calculated above and such that:

$$K_x \propto \frac{\cos^2\theta}{\sigma_x^2} + \frac{\sin^2\theta}{\sigma_y^2}.$$

The processor 630 (or 630b) continues by calculating values $v_i = r_i + z_i$. These are the $-\log(p)$ probabilities for each of the one dimensional constellation points in the most reliable dimension, not accounting for the unreliable dimension.

The values $v_i$ are sorted, and a subset of the most reliable values is retained, $V_0, V_1, \ldots$ (e.g., the number included in this subset may be of any desired choice, including 4 in one embodiment). This subset includes the first probability values for the most likely points in the reliable dimension (e.g., selected dimension), not taking the unreliable dimension into account.

These operations described above (e.g., beginning with 'a priori' bit log-likelihood information conversion to the calculating of values $v_i = r_i + z_i$) are repeated, but this time with values from the least reliable dimension (e.g., the non-selected dimension).

However, to differentiate from the reliable dimension (e.g., selected dimension), the resultant values in this phase of operations are labeled: $u_i$. These are the $-\log(p)$ probabilities for each of the one dimensional constellation points in the least reliable dimension (e.g., the non-selected dimension), not accounting for the reliable dimension.

For each value, $V_k$, $k=0, 1, 2 \ldots$, from the operation of selecting the subset of the most reliable values, the processor 630 (or 630b) is operative to compute:

$$t_{ik} = u_i + K_{xy}(x-x_k)(y-y_i) + V_k,$$

retaining the most reliable value for each point i, where $$K_{xy} \propto \sin 2\theta \left( \frac{1}{\sigma_x^2} - \frac{1}{\sigma_y^2} \right).$$

These values may be referred to as: $T_i$. They are the $-\log(p)$ probabilities for each of the one dimensional constellation points in the least reliable dimension (e.g., the non-selected dimension) accounting for the most reliable dimension (e.g., selected dimension).

The values $T_i$ are sorted, and a subset of the most reliable values is retained, $U_0, U_1, \ldots$ (e.g., as with respect to the other dimension, the number included in this subset may be of any desired choice, including 4 in one embodiment). These are the $-\log(p)$ probabilities of the most likely points in the least reliable dimension (e.g., non-selected dimension).

For each value, $U_0, U_1, \ldots$ determined from above, the processor 630 (or 630b) is operative to compute: $s_{ik} = z_i + K_{xy}(y-y_k)(x-x_i) + U_k$, retaining the most reliable value for each point i, where $$K_{xy} \propto \sin 2\theta \left( \frac{1}{\sigma_y^2} - \frac{1}{\sigma_x^2} \right)$$

and $z_i$ from above.

These values may be referred to as: $S_i$. They are the $-\log(p)$ probabilities for each of the one dimensional constellation points in the most reliable dimension (e.g., selected dimension) accounting for the least reliable dimension (e.g., non-selected dimension).

For each bit, b, the processor 630 (or 630b) is operative to select the most reliable values in $S_i$ (such as the 2 most reliable values in $S_i$ if coded in the most reliable dimension) or $T_i$ (such as the 2 most reliable values in $T_i$ if coded in the least reliable dimension) where the bit is a logic one, $W_{1a}, W_{1b}$ and the two most reliable values where the bit is a logic zero, $W_{0a}, W_{0b}$.

In one embodiment, the processor 630 (or 630b) is then operative to determine a final probability of the signal based on the first subset of the first plurality of probabilities (e.g., associated with the reliable dimension) and the second subset of the second plurality of probabilities (e.g., associated with the least reliable dimension). This is the final log-likelihood value which incorporates all information from both dimensions as well as taking the 'a priori' information into account.

In an alternative embodiment, the mapping operations and functionality may be performed by computing the bit probabilities associated with the selected dimension (e.g., the reliable dimension) with no help whatsoever from the non-selected dimension (e.g., the unreliable dimension), yet uses all of the information (e.g., from both the selected or reliable dimension as well as the non-selected or unreliable dimension) to compute the probabilities for the non-selected dimension (e.g., unreliable dimension). That is to say, the use of the respective subset based processing as described just above need not necessarily be performed in all embodiments. Other embodiments envision using all of the information (e.g., from both the selected or reliable dimension as well as the non-selected or unreliable dimension) to compute the probabilities for the non-selected dimension (e.g., unreliable dimension).

This determination of the final probability of the signal may be made in accordance with computing the values: $L_b = \min^*(W_{1a}, W_{1b}) - \min^*(W_{0a}, W_{0b})$, where $$\min^*(a,b) = \min(a,b) - \log(1 + e^{-|b-a|}).$$

This operation above may be viewed as min* processing.

It is noted that such min* processing is but one embodiment by which the final probability of the signal may be determined. Other means of calculating the final probability of the signal may be made without departing from the scope and spirit of the invention.

It is of course noted that the calculations made above employ x as being associated with the selected dimension. Of course, if the other dimension (y) is more reliable the x, then all references to x any y values above may be swapped.

It is noted that the embodiment described above is operative to perform one full demapping iteration in which both dimensions are treated fully and completely. That is to say, one particular embodiment envisioned herein performs only one full demapping iteration.

However, with respect to other alternative embodiments, it is noted that multiple iterations may be performed in which the final log-likelihood values may be used as the initial information in a subsequent iteration in which the demapping process is performed again. In other words, the iterative processing may go back and forth any desired number of times between the most reliable dimension (e.g., selected dimension) accounting for the least reliable dimension (e.g., non-selected dimension). The criteria used to terminate the iterative demapping processing may be varied (e.g., a certain number of iterations, a difference between results from successive iterations being less than some threshold [that is predetermined or adaptively determined], etc).

After a number of iterations is performed, the processor 630 (or 630b) is then operative to determine a final probability of the signal based on the most recent/last updated subset of the first plurality of probabilities (e.g., associated with the reliable dimension) and the most recent/last updated subset of the second plurality of probabilities (e.g., associated with the least reliable dimension).

In even an alternative embodiment, a subset including the first probability values for the most likely points in the reliable dimension (e.g., selected dimension) may be selected, not taking the unreliable dimension into account. Then, processing may be made with respect to the least reliable dimension (e.g., non-selected dimension) without going back to the reliable dimension (e.g., selected dimension) to perform any updating therein. As such, the processor 630 (or 630b) is then operative to determine a final probability of the signal based on the first subset of the first plurality of probabilities (e.g., associated with the reliable dimension) and all of the second plurality of probabilities (e.g., associated with the least reliable dimension) [or a subset thereof].

Referring to the embodiment 700 of FIG. 7, this embodiment is somewhat analogous to the previous embodiment with at least some differences being that a decoder 740 (e.g., such as an ECC and/or FEC decoder) is operative to make some estimates of the original information (e.g., the original bits) that were encoded, modulated, etc. These estimates may be fed back to any one or more of the AFE 710 (or 710a), rotation module or component 710b, selector 720, processor 730 (or 730b) for use in one or more additional iterations of demapping.

FIG. 8A, FIG. 8B, FIG. 9, FIG. 10A, and FIG. 10B illustrate various embodiment of methods for operating a communication device.

Figure 8:
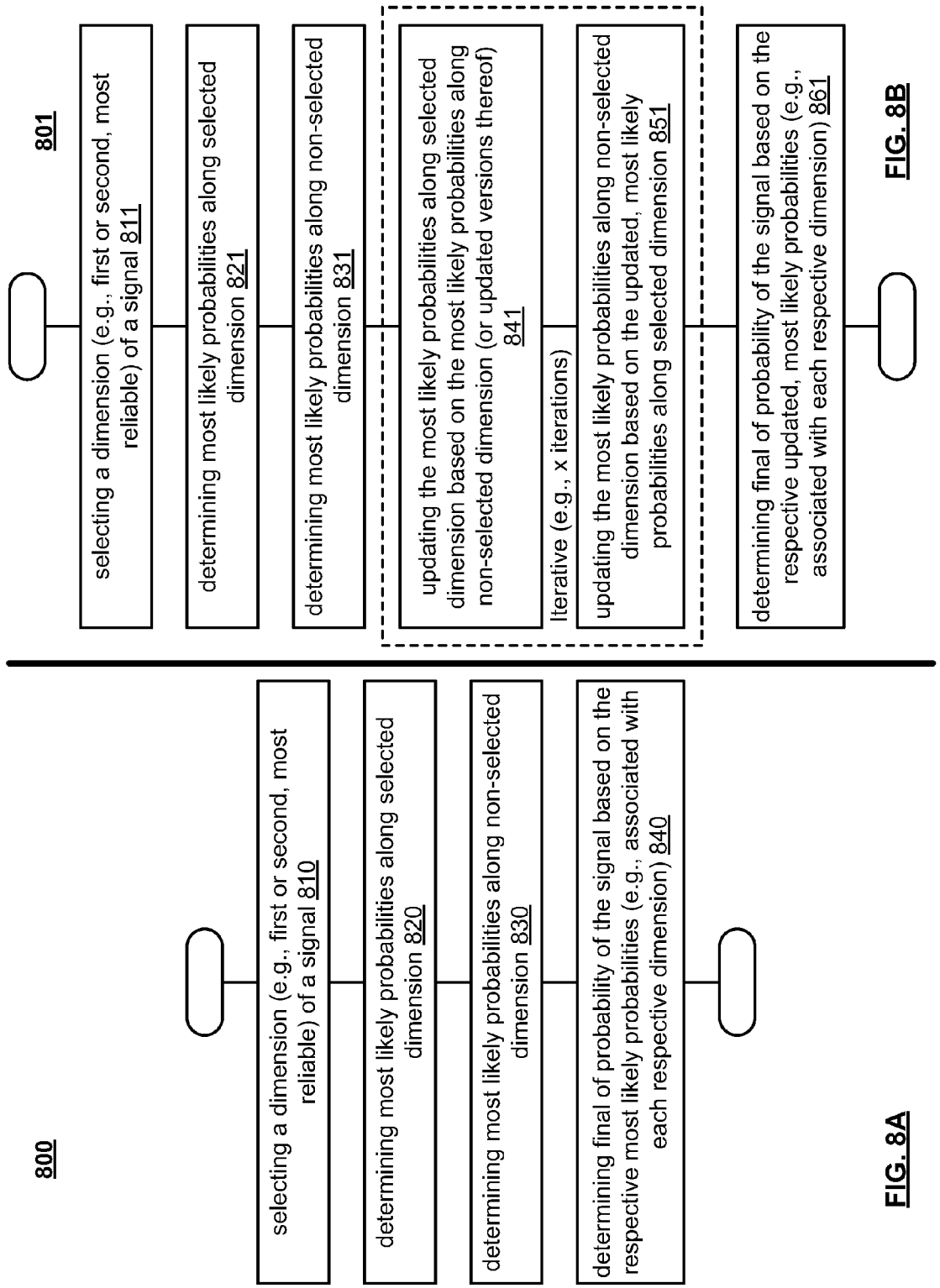

Referring to method 800 of FIG. 8A, the method 800 begins by selecting a dimension (e.g., first or second, most reliable) of a signal, as shown in a block 810. The method 800 continues by determining most likely probabilities along selected dimension, as shown in a block 820.

The method 800 then operates by determining most likely probabilities along non-selected dimension, as shown in a block 830. The method 800 continues by determining final of probability of the signal based on the respective most likely probabilities (e.g., associated with each respective dimension), as shown in a block 840.

Referring to method 801 of FIG. 8B, the method 801 begins by selecting a dimension (e.g., first or second, most reliable) of a signal, as shown in a block 811. The method 801 then operates by determining most likely probabilities along selected dimension, as shown in a block 821.

The method 801 continues by determining most likely probabilities along non-selected dimension, as shown in a block 831. The method 801 then operates by updating the most likely probabilities along selected dimension based on the most likely probabilities along non-selected dimension (or updated versions thereof), as shown in a block 841.

The method 801 then operates by updating the most likely probabilities along non-selected dimension based on the updated, most likely probabilities along selected dimension, as shown in a block 851. The operations of the blocks 841 and 851 may be repeated in accordance with an iterative embodiment any desired number of times.

The method 801 continues by determining final of probability of the signal based on the respective updated, most likely probabilities (e.g., associated with each respective dimension), as shown in a block 861.

Figure 9:
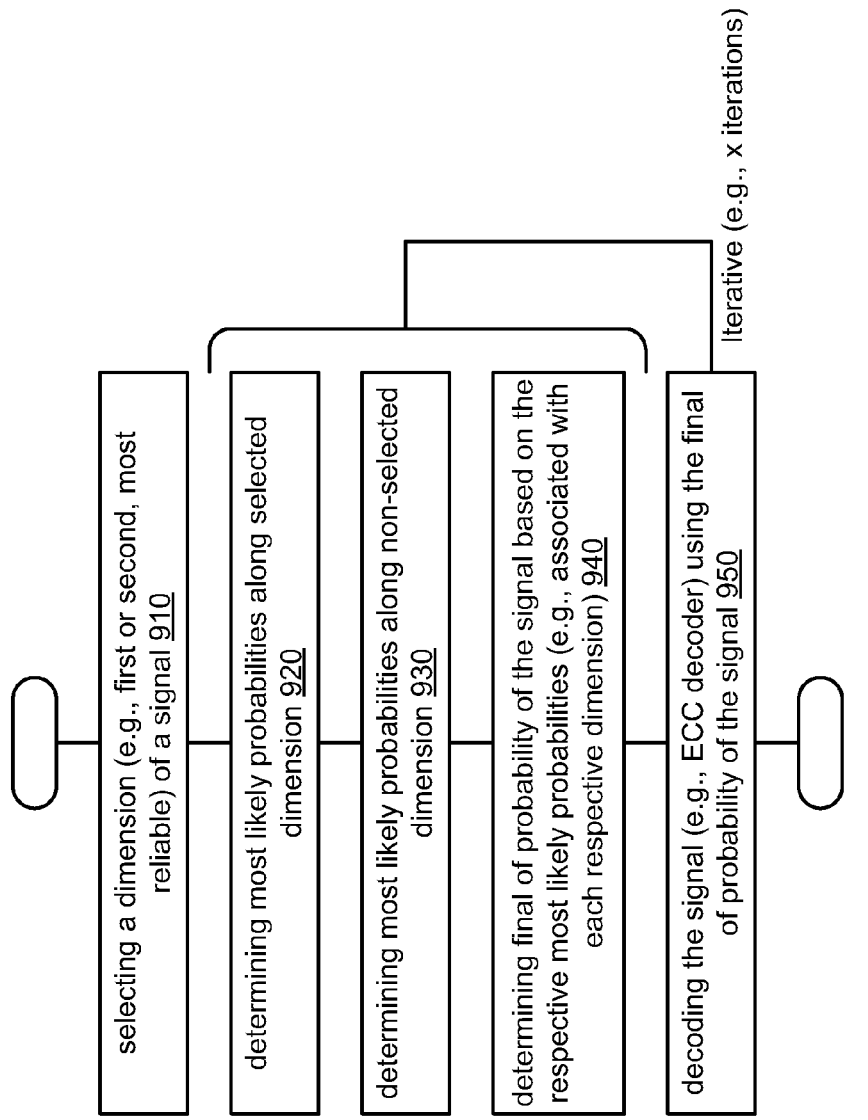

Referring to method 900 of FIG. 9, the method 900 begins by selecting a dimension (e.g., first or second, most reliable) of a signal, as shown in a block 910. The method 900 continues by determining most likely probabilities along selected dimension, as shown in a block 920.

The method 900 then operates by determining most likely probabilities along non-selected dimension, as shown in a block 930.

The method 900 continues by determining final of probability of the signal based on the respective most likely probabilities (e.g., associated with each respective dimension), as shown in a block 940.

The method 900 continues by decoding the signal (e.g., ECC decoder) using the final of probability of the signal, as shown in a block 950, to make best estimates of information bits encoded therein. In accordance with an iterative embodiment, the best estimates may be provided for use in performing more than one iteration of the operations of the blocks 910-940.

Referring to method 1000 of FIG. 10A, the method 1000 begins by selecting a dimension (e.g., first or second, most reliable) of a signal, as shown in a block 1010. The method 1000 continues by calculating each of first plurality of probabilities associated with selected dimension, as shown in a block 1020.

The method 1000 then operates by selecting subset of the first plurality of probabilities, as shown in a block 1030. The method 1000 continues by calculating each of second plurality of probabilities associated with non-selected dimension based on the subset of the first plurality of probabilities, as shown in a block 1040.

The method 1000 continues by determining final of probability of the signal based on the subset of the first plurality of probabilities and the second plurality of probabilities, as shown in a block 1050.

Referring to method 1001 of FIG. 10B, the method 1001 begins by selecting a dimension (e.g., first or second, most reliable) of a signal, as shown in a block 1011. The method 1001 then operates by calculating each of first plurality of probabilities associated with selected dimension, as shown in a block 1021.

The method 1001 continues by selecting subset of the first plurality of probabilities, as shown in a block 1031. The method 1001 then operates by calculating each of second plurality of probabilities associated with non-selected dimension based on the subset of the first plurality of probabilities, as shown in a block 1041.

The method 1001 continues by selecting subset of the second plurality of probabilities, as shown in a block 1051. The method 1001 then operates by determining final of probability of the signal based on the respective subsets of probabilities, as shown in a block 1061.

As may be seen, there are multiple variants and embodiments by which demapping may be performed in accordance with various aspects and principles, and their equivalents, of the invention. Some embodiments operate in accordance with iterative processing in which certain desired steps (e.g., updating of the selected and non-selected dimensions) are repeated. In other iterative embodiments, estimates generated by a decoder are used to modify any of the operations associated with other steps in the demapping process.

Also, while many of the embodiments described herein are related to modulations having 2-D constellations, it is noted that the various aspects and principles, and their equivalents, of the invention may be extended to even modulations of higher order (e.g., three dimensions, four dimensions, etc.).

Instead of operating in accordance with two dimensions, the operations would be extended to each of the multiple dimensions.

The following is also noted:

$$\forall N \in Z^+, N \neq 1 \exists i, K, J \in Z^*: N^2 = 2^i K^2 \pm L^2, \text{ where } N > K, N > L.$$

This permits extremely efficient construction of an array processor which simultaneously computes the value of $K(x-x_i)^2$, for each of a group of $x_i$'s which are equally spaced, requiring only adders and two multipliers. This is one of the computations employed in accordance with embodiments of the functionality and/or architecture. Such reduction in hardware complexity can allow for the implementation of hardware to effectuate such functionality and/or architecture relatively much cheaper and using a much smaller footprint.

It is noted that the various modules and/or circuitries (e.g., encoding modules and/or circuitries, decoding modules and/or circuitries, processing modules and/or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. An apparatus, comprising:
   a selector for selecting a first dimension or a second dimension based on relative reliability of a first dimension component and a second dimension component of a signal thereby determining a selected dimension and a non-selected dimension; and
   a processor for:
      calculating a first plurality of probabilities associated with the selected dimension without accounting for influence from the non-selected dimension and selecting a subset of the first plurality of probabilities based on relative reliability of the first plurality of probabilities;
      based on the subset of the first plurality of probabilities, calculating a second plurality of probabilities associated with the non-selected dimension thereby accounting for influence from the selected dimension and selecting a subset of the second plurality of probabilities based on relative reliability of the second plurality of probabilities; and
      determining a final probability of the signal based on the subset of the first plurality of probabilities and the subset of the second plurality of probabilities.

2. The apparatus of claim 1, wherein:
   the first dimension and the second dimension associated with a modulation including a plurality of constellation points each having a respective label.

3. The apparatus of claim 1, wherein:
   a rotator module for rotating the first dimension and the second dimension before the selector selecting the first dimension or the second dimension.

4. The apparatus of claim 1, wherein:
   the processor updating the subset of the first plurality of probabilities based on the subset of the second plurality of probabilities; and the processor determining the final probability of the signal based on the updated subset of the first plurality of probabilities.

5. The apparatus of claim 1, wherein:
the processor updating the subset of the first plurality of probabilities based on the subset of the second plurality of probabilities;
the processor updating the subset of the second plurality of probabilities based on the updated subset of the first plurality of probabilities; and
the processor determining the final probability of the signal based on the updated subset of the first plurality of probabilities and the updated subset of the second plurality of probabilities.

6. The apparatus of claim 1, wherein:
the relative reliability of the first dimension component and the second dimension component based on a first noise power associated with the first dimension component and a second noise power associated with the second dimension component.

7. The apparatus of claim 1, wherein:
the apparatus being a communication device; and
the communication device being operative within at least one of a satellite communication system, a wireless communication system, a wired communication system, and a fiber-optic communication system.

8. An apparatus, comprising:
a selector for selecting a first dimension or a second dimension based on relative reliability of a first dimension component and a second dimension component of a signal thereby determining a selected dimension and a non-selected dimension; and
a processor for:
calculating a first plurality of probabilities associated with the selected dimension and selecting a subset of the first plurality of probabilities;
based on the subset of the first plurality of probabilities, calculating a second plurality of probabilities associated with the non-selected dimension and selecting a subset of the second plurality of probabilities; and
determining a final probability of the signal based on the subset of the first plurality of probabilities and the subset of the second plurality of probabilities.

9. The apparatus of claim 8, wherein:
the first dimension and the second dimension associated with a modulation including a plurality of constellation points each having a respective label.

10. The apparatus of claim 8, wherein, at least one:
the first dimension and the second dimension corresponding to an in-phase dimension and a quadrature dimension, respectively; and
the first dimension and the second dimension corresponding to a real dimension and an imaginary dimension, respectively.

11. The apparatus of claim 8, wherein:
a rotator module for rotating the first dimension and the second dimension before the selector selecting the first dimension or the second dimension.

12. The apparatus of claim 8, wherein:
the processor selecting the subset of the first plurality of probabilities based on relative reliability of the first plurality of probabilities; and
the processor selecting the subset of the second plurality of probabilities based on relative reliability of the second plurality of probabilities.

13. The apparatus of claim 8, wherein:
the processor updating the subset of the first plurality of probabilities based on the subset of the second plurality of probabilities; and
the processor determining the final probability of the signal based on the updated subset of the first plurality of probabilities.

14. The apparatus of claim 8, wherein:
the processor updating the subset of the first plurality of probabilities based on the subset of the second plurality of probabilities;
the processor updating the subset of the second plurality of probabilities based on the updated subset of the first plurality of probabilities; and
the processor determining the final probability of the signal based on the updated subset of the first plurality of probabilities and the updated subset of the second plurality of probabilities.

15. The apparatus of claim 8, wherein:
the relative reliability of the first dimension component and the second dimension component based on a first noise power associated with the first dimension component and a second noise power associated with the second dimension component.

16. The apparatus of claim 8, wherein:
the calculating the first plurality of probabilities associated with the selected dimension not accounting for influence from the non-selected dimension.

17. The apparatus of claim 8, wherein:
the apparatus being a communication device; and
the communication device being operative within at least one of a satellite communication system, a wireless communication system, a wired communication system, and a fiber-optic communication system.

18. A method, comprising:
receiving a signal from a communication channel;
selecting a first dimension or a second dimension based on relative reliability of a first dimension component and a second dimension component of the signal thereby determining a selected dimension and a non-selected dimension;
calculating a first plurality of probabilities associated with the selected dimension and selecting a subset of the first plurality of probabilities;
based on the subset of the first plurality of probabilities, calculating a second plurality of probabilities associated with the non-selected dimension and selecting a subset of the second plurality of probabilities; and
determining a final probability of the signal based on the subset of the first plurality of probabilities and the subset of the second plurality of probabilities.

19. The method of claim 18, wherein:
the first dimension and the second dimension associated with a modulation including a plurality of constellation points each having a respective label.

20. The method of claim 18, wherein, at least one:
the first dimension and the second dimension corresponding to an in-phase dimension and a quadrature dimension, respectively; and
the first dimension and the second dimension corresponding to a real dimension and an imaginary dimension, respectively.

21. The method of claim 18, further comprising:
rotating the first dimension and the second dimension before selecting the first dimension or the second dimension.

22. The method of claim 18, further comprising:

selecting the subset of the first plurality of probabilities based on relative reliability of the first plurality of probabilities; and selecting the subset of the second plurality of probabilities based on relative reliability of the second plurality of probabilities.

23. The method of claim 18, further comprising:

updating the subset of the first plurality of probabilities based on the subset of the second plurality of probabilities; and determining the final probability of the signal based on the updated subset of the first plurality of probabilities.

24. The method of claim 18, further comprising:

updating the subset of the first plurality of probabilities based on the subset of the second plurality of probabilities;

updating the subset of the second plurality of probabilities based on the updated subset of the first plurality of probabilities; and determining the final probability of the signal based on the updated subset of the first plurality of probabilities and the updated subset of the second plurality of probabilities.

25. The method of claim 18, wherein:

the relative reliability of the first dimension component and the second dimension component based on a first noise power associated with the first dimension component and a second noise power associated with the second dimension component.

26. The method of claim 18, further comprising:

the calculating the first plurality of probabilities associated with the selected dimension not accounting for influence from the non-selected dimension.

27. The method of claim 18, wherein:

the method being performed within a communication device; and the communication device being operative within at least one of a satellite communication system, a wireless communication system, a wired communication system, and a fiber-optic communication system.

* * * * *